(12) United States Patent
Baentsch et al.

(10) Patent No.: US 9,811,646 B2
(45) Date of Patent: Nov. 7, 2017

(54) METHOD, SECURE DEVICE, SYSTEM AND COMPUTER PROGRAM PRODUCT FOR SECURELY MANAGING FILES

(75) Inventors: Michael Baentsch, Gross (CH); Peter Buhler, Horgen (CH); Harold D Dykeman, Richterswil (CH); Reto J Hermann, Buttikon (CH); Frank Hoering, Zurich (CH); Michael P Kuyper-Hammond, Kaltbrunn (CH); Diego Alejandro Ortiz-Yepes, Adliswil (CH); Thomas D Weigold, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 13/822,137

(22) PCT Filed: Aug. 8, 2011

(86) PCT No.: PCT/IB2011/053526
§ 371 (c)(1),
(2), (4) Date: May 28, 2013

(87) PCT Pub. No.: WO2012/035451
PCT Pub. Date: Mar. 22, 2012

(65) Prior Publication Data
US 2013/0232584 A1 Sep. 5, 2013

(30) Foreign Application Priority Data
Sep. 16, 2010 (EP) .................................... 10177226

(51) Int. Cl.
G06F 21/12 (2013.01)
G06F 21/10 (2013.01)
G06F 21/62 (2013.01)

(52) U.S. Cl.
CPC ............ G06F 21/121 (2013.01); G06F 21/10 (2013.01); G06F 21/6218 (2013.01)

(58) Field of Classification Search
USPC ............ 726/29, 2, 21, 26, 36; 713/150, 163, 713/181; 380/255, 264, 276
See application file for complete search history.

(56) References Cited

U.S. PATENT DOCUMENTS 6,484,143 B1 11/2002 Swildens et al.
6,751,677 B1 6/2004 Ilnicki et al.
(Continued)

FOREIGN PATENT DOCUMENTS

CN 1378172 A 11/2002
CN 1971576 A 5/2007
(Continued)

OTHER PUBLICATIONS

Weigold"The Zurich Trusted Information Channel.an efficient defence against man-in-the-middle and malicious software attacks"Trusted ComputingChallenges and applications 2008.
(Continued)

*Primary Examiner* — Hadi Armouche
*Assistant Examiner* — Sharif E Ullah
(74) *Attorney, Agent, or Firm* — Nicholas L. Cadmus; William H. Hartwell; Tihon Poltavets (57) ABSTRACT

A method, a secure device and a computer program product for securely managing files. The method includes providing a secure device, where the secure device is protected by design against malicious software or malware and adapted to establish a connection to a server via a host, the host connected to the server through a telecommunication network, upon receiving a request for using a file stored on the secure device, processing the request at the secure device according to an updated use permission associated to the file,
(Continued)

where the updated use permission is obtained by instructing at the secure device to establish a connection between the secure device and the server via the host and updating at the device the use permission associated to the file, according to permission data sent from the server through the established connection.

15 Claims, 4 Drawing Sheets

(56) References Cited

U.S. PATENT DOCUMENTS

| | | | |
|---|---|---|---|
| 2002/0029263 A1 | 3/2002 | Toyoshima et al. | |
| 2003/0110397 A1 | 6/2003 | Supramaniam et al. | |
| 2005/0005133 A1 | 1/2005 | Xia et al. | |
| 2006/0230459 A1 | 10/2006 | Lam | |
| 2006/0236100 A1 | 10/2006 | Baskaran et al. | |
| 2009/0007223 A1* | 1/2009 | Centonze et al. | 726/1 |
| 2009/0248580 A1 | 10/2009 | Baentsch et al. | |
| 2010/0098248 A1 | 4/2010 | Anantharaman | |
| 2012/0099219 A1* | 4/2012 | Al-Azzawi | G06F 21/56 360/62 |
| 2014/0019498 A1* | 1/2014 | Cidon et al. | 707/827 |

FOREIGN PATENT DOCUMENTS

| | | |
|---|---|---|
| CN | 101091183 A | 12/2007 |
| CN | 103080946 A | 5/2013 |
| CN | 103080946 A1 | 5/2013 |
| EP | 1089156 A2 | 4/2001 |
| GB | 2462442 A | 2/2010 |
| JP | H10135943 A | 5/1998 |
| JP | 2003044398 A | 2/2003 |
| JP | 2008134789 A | 6/2008 |
| JP | 2008282164 A | 11/2008 |
| JP | 2009075922 A | 4/2009 |
| JP | 2012503229 A1 | 2/2012 |
| JP | 5783650 B2 | 9/2015 |
| WO | WO 99/60458 A2 | 11/1999 |
| WO | WO2004099940 * | 1/2004 |
| WO | WO 2004/092931 A2 | 10/2004 |
| WO | WO 2006/070330 A1 | 7/2006 |
| WO | 2010032207 A1 | 3/2010 |
| WO | 2012035451 A1 | 3/2012 |

OTHER PUBLICATIONS

Yan et al., Proceedings of the 5th WSEAS International Conference on Applied Computer Science, Hangzhou, China, Apr. 16-18, 2006 (pp. 1057-1064).

"PCT Notification of Transmittal of the International Search Report and the Written Opinion of the International Searching Authority, or the Declation", International Searching Authority, International Application No. PCT/IB2011/053526, Date of the actual completion of the International search, Nov. 4, 2011, 10 pages.

* cited by examiner

METHOD, SECURE DEVICE, SYSTEM AND COMPUTER PROGRAM PRODUCT FOR SECURELY MANAGING FILES

CROSS-REFERENCE TO RELATED APPLICATION

This application is a National Phase Application based on PCT/162011/053256 which claims priority from European Patent Application No. 10177226.7 filed Sep. 16, 2010, the entire contents of both of which are incorporated herein by reference.

FIELD OF THE INVENTION

The invention relates to a method using a secure device for securely managing files distributed to users. In particular, it relates to a method using a secure device protected by design against malicious software or malware and adapted to establish a connection to a server, e.g., a secure connection such as an SSL/TLS connection. Consistently, the invention relates to such a device, as well as a system comprising such a device or a computer program medium for implementing the said method and corresponding server components.

BACKGROUND OF THE INVENTION

Security problems with PCs make them unsuitable for many functions since data entered by users can be manipulated or copied by an attacker. For example, transactions can be changed to send money to unwanted recipients or to order unwanted goods, or user credentials can be copied providing attackers with access to systems such as those used for Internet banking.

To solve some of these problems, a user secure device (also a "trusted device") can be used together with a PC. One such solution, the IBM Zone Trusted Information Channel (see Thomas Weigold, Thorsten Kramp, Reto Hermann, Frank Höring, Peter Buhler, Michael Baentsch, "The Zurich Trusted Information Channel—An Efficient Defence against Man-in-the-Middle and Malicious Software Attacks", In P. Lipp, A.-R. Sadeghi, and K.-M. Koch (Eds.): TRUST 2008, LNCS 4968, pp. 75-91, 2008), allows the user to verify information associated with a transaction (e.g., in the case of Internet banking the amount and recipient) before the transaction is executed by the service provider (e.g., the bank). The transaction is verified on the device, which is secure and can send the verified information to the back-end system in a secure manner.

Besides, given the availability of low-cost, high-capacity USB flash drives, secure document management has become an area of concern for any IT organization. There are notably two problems:

1. External data loss: large amounts of sensitive data can easily be stored and transported on devices such as USB flash drives. The loss of such a device can create a legal or financial exposure for a company.
2. Employee data theft: sensitive data can easily be stolen by employees who have access thereto via a PC.

Solutions are now emerging on the market for the first problem. For instance, data on USB drives can be encrypted and password protected. Similar to other IT systems, if a wrong password is entered more than a specified number of times, then the devices lock, thereby making the data inaccessible.

The second problem can be addressed by blocking, within a company, USB ports for mass-storage devices. Unfortunately, such solutions also prevent many legitimate and useful applications of portable storage devices. Another approach is to use monitoring software on the user's PC in order to detect and prevent data copying that violates given policies. However such software solutions are only as secure as the system and application software used to implement it, i.e., in the presence of a determined attacker, they cannot solve the problem.

A related challenge is the secure distribution of sensitive documents. A document can be encrypted prior to distribution, which protects the documents while it is in transit and once it is stored on a user's PC, assuming it is stored in an encrypted form. However, as soon as the document is decrypted, for example for viewing, it is exposed, whence a risk. Inside of a company, the risk is limited by the overall security of the company's IT infrastructure that is used to process (e.g., view or print) the documents. Yet, when such a document is decrypted outside of a company, e.g., on a PC with Internet connectivity, or when the security of a company PC is compromised, such document is once more exposed.

There is accordingly a need for improving current methods for secure distribution of sensitive documents and more generally, for securely managing files.

BRIEF SUMMARY OF THE INVENTION

According to a first aspect thereof, the present invention provides a method for a method for securely managing files, comprising the steps of: providing a secure device, wherein the secure device is protected by design against malicious software or malware and adapted to establish a connection to a server, via a host connected to the server through a telecommunication network; upon receiving a request for using a file stored on the secure device, processing the request at the secure device according to an updated use permission associated to the file, wherein the updated use permission is obtained by: instructing at the secure device to establish a connection between the secure device and the server, via the host; and updating at the device a use permission associated to the file, according to permission data sent from the server through the established connection.

In embodiments, the method may comprise one or more of the following features:

- The method further comprises a step of storing the file at the device, the file sent from the server through a connection established between the secure device and the server;
- The method further comprises, after receiving the request at the device, a step of: updating the use permission associated to the file upon granting the request received at the secure device;
- The method further comprises, before receiving the request for using the file and after updating the use permission associated to the file, a step of instructing at the secure device to expose the file to a user interface or an application, according to the updated use permission;
- A connection established via the host is a secure connection, such as an SSL/TLS connection;
- The file stored on the device is encrypted according to a given encryption scheme and wherein the method further comprises a step of: receiving at the secure device a decryption key for decrypting the file, the decryption key sent from the server through a connection established between the secure device and the server;

The method further comprises a step of encrypting a file at the device, using an encryption key, the encryption key stored on a smart card or an internal memory of the device which is not externally accessible, or entered by the user at the device;

The updated use permission comprises a parameter, which as interpreted by the device for processing a request for using the file, restricts access rights to the file, such as the number of times that the associated file can be accessed or the time during which it can be accessed;

The updated use permission, as maintained at the secure device, decomposes into several sub-permissions, each associated to a given type of request, for example a request for: reading at the device; printing at an external printer; or reading from an external device such as a beamer;

The step of updating the use permission upon granting the request comprises: updating at the device the use permission associated to the file;

The step of updating the use permission upon granting the request comprises: sending to the server data related to the processed request, through a connection established between the secure device and the server; and updating at the server the use permission associated to the file; and The method further comprises a step of logging at the server the request received for using the file.

According to another aspect, the invention is embodied as secure device protected by design against malicious software or malware and having processing means, a memory and interfaces, configured to couple to or interact with: a user; a host, such as a personal computer or PC, and a server, the secure device adapted to establish a connection such as a TLS/SSL connection with a server, via a host, when the secure device is connected to the host and the server and the host are connected through a telecommunication network, and further comprising a computerized method stored on the memory and executable by the processing means for implementing the steps of methods according to the invention.

According to a further aspect, the invention is embodied as a system comprising the secure device according to the invention; a personal computer or PC; and a server.

According to a final aspect, the invention is embodied as a computer program medium comprising instructions executable by processing means for executing all the steps of the method according to the invention.

Methods, devices and systems embodying the present invention will now be described, by way of non-limiting examples, and in reference to the accompanying drawings.

BRIEF DESCRIPTION OF SEVERAL VIEWS OF THE DRAWINGS

FIGS. 4 and 5 illustrate such data structures before and after updating use permissions at the device, respectively.

DETAILED DESCRIPTION OF THE INVENTION

As an introduction to the following description, it is first pointed at a general aspect of the invention, directed to a method for securely managing files. The method makes use of a user secure (or trusted) device, the latter protected by design against malicious software or malware. Upon receiving a request for using a file stored on the device, the device processes the request according to an updated use permission associated to the file. "Processing" the request typically means: grant the request if possible (based on the updated use permission) and subsequently take steps to execute the request (e.g., starting with decrypting the file, if the latter is stored in an encrypted state). The use permission is subsequently updated, if necessary: this actually depends on the type of permissions involved and whether the request has been granted. The permission used to process the request in the first place is obtained by first instructing at the device to establish a connection to a server, e.g., an SSL/TLS connection, via a host of a telecommunication network to which the server is connected. Next, the device updates the use permission according to data sent from the server through the established connection. The file at stake can be sent from the server too, e.g., if the required version of the file is not already stored on the device.

When receiving a request for using a file (that is, an access request, e.g., view or print the file), the device is able to process the request according to an updated state of the corresponding permission, e.g., in accordance with given server (i.e., company) policies. Therefore, it is possible to restrict the use of files made available to users (from a server), and this, in accordance with a given policy.

Figure 1:
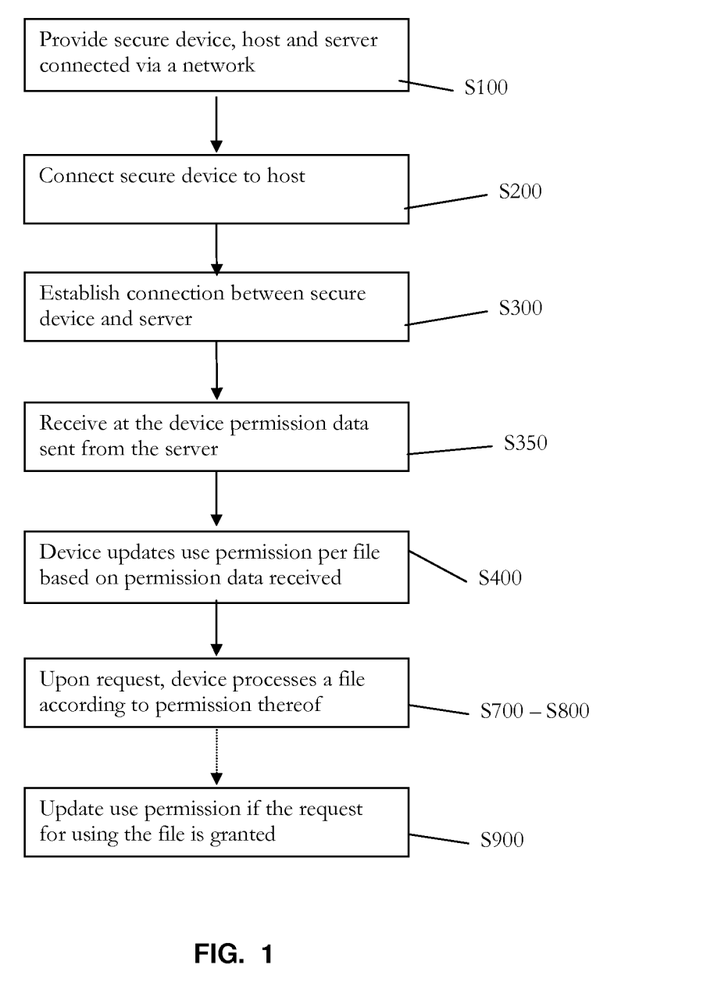
FIG. 1 is a flowchart depicting steps of a general embodiment of the method according to the invention.
Figure 3:
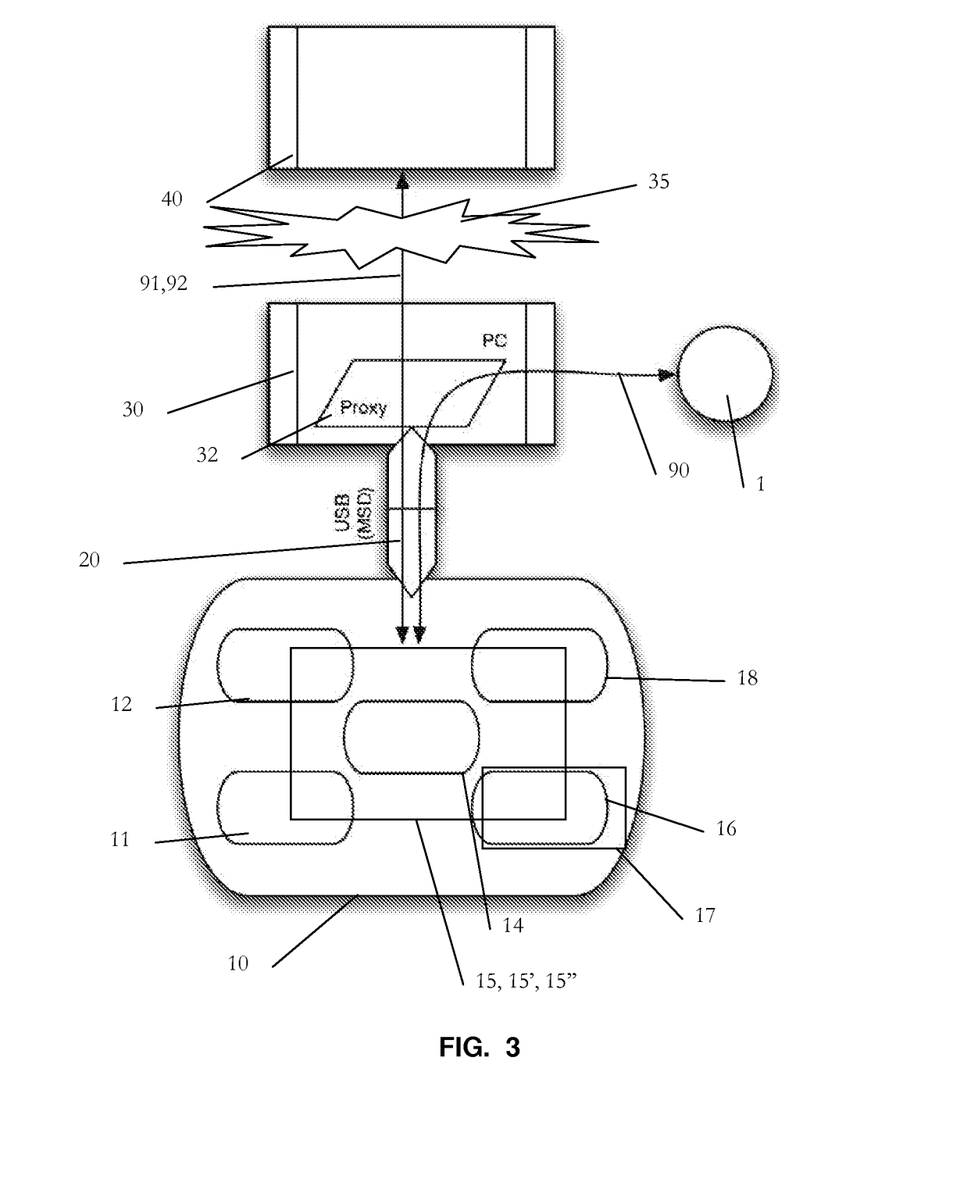
FIG. 3 is a schematic representation of a secure device coupled to a terminal and a server, arranged according to an embodiment of the invention, and allowing for securely managing file use.

More in details, FIG. 1 depicts a flowchart illustrating a general embodiment of the method. FIG. 3 is a schematic representation of an example of secure device coupled to a terminal and a server via a network.

Referring to FIGS. 1 and 3 altogether: the invention relies first and foremost on a secure device 10 (step S100). As said, the latter is protected by design against malicious software or malware. For example, the secure device may be deprived from some client interfaces for software installation or other functions that would expose it to a malware. However, the device is typically provided with simple user input and output capabilities for entering and reviewing user security elements, e.g., PINs or smart cards.

The device is adapted to establish a connection 91, e.g., a secure connection such as a mutually authenticated connection to a server and/or any suitable source 40, via a host 30 of the telecommunication network 35, such as the Internet network. The host is preferably a PC connected to the network. The terminal can else be any other suitable source such as a personal digital assistant or PDA or mobile phone. A suitable type of secure connection to a server is a TLS/SSL connection.

Besides, the secure device is provided with a computerized method stored in its memory for executing steps of the method described hereinafter.

Preferred features of this device are depicted in FIG. 3. Typically, the secure device 10 has processing means (or computing means) 15 coupled to a memory, which typically comprises both persistent and non-persistent memories 15' and 15". The persistent memory stores e.g., the computerized method evoked above, to be executed by the said processing means.

In addition, the device is further provided with at least one interface 20, e.g., a USB interface, for communicating with the host of the network 35, e.g., the PC 30. In embodiments, the same interface 20 (or another type of interface) shall furthermore allow the secure device to communicate with an external device such as a beamer, a printer, a secure PC (e.g., one that is only used for viewing sensitive material and never connected to a network) or any other output device (not shown).

If necessary, the secure device has a card reader 17 to read user credentials stored on a memory card 16, e.g., a smart card. Suitable use can safely be made out of such data, e.g., user credentials as stored on the card. In particular, a trustworthy connection can be established between a user 1 (or strictly speaking the device 10) and a third party (e.g., the server 40) via the terminal 30, using such data. In a variant, the user credentials may be stored directly on the persistent memory of the secure device.

Further interfaces (like control buttons 18 and display 12) allow for direct interaction with the user.

In practice, a first step is to connect (step S200) the secure device 10 to a suitable host 30 of the network 35. For the sake of illustration, it is hereafter considered that the host is a PC connectable to a server 40 through the Internet network 35.

The device 10 can then invoke a computerized method stored thereon to trigger a trustworthy connection to the server 40, step S300. For instance, it may establish a secure communication 91 with the server over a non-secure connection 92 via the terminal 30 (e.g., upon unlocking the card).

Preferably, the device is authenticated to the server while initiating the communication 91 over the non-secure connection 92, e.g., by initiating a SSL/TLS authentication to the server, using user credentials as stored on the card or on the internal memory of the secure device. In this regards, setting the device in communication with the server may advantageously comprise starting, from the device, a proxy client residing at the terminal, in order for the device to connect to the server, via the terminal (note that the proxy may possibly reside on the device too). The proxy relays bits received from the device to the internet and vice versa. Authenticating the device to the server can be achieved, e.g., bi-directionally, by initiating from the device the SSL/TLS authentication to the server.

In this respect, the memory 15" may further have stored thereon a security software stack, including cryptographic algorithms, such as a TLS engine 14 for the SSL/TLS authentication. It may further store a USB management software (implementing a USB mass storage device or MSD profile 20), and possibly a pre-loaded networking proxy, as evoked above. As said, user credentials can be stored on the memory card (e.g., a smart card 16), such as client-server certificates (e.g., X.509) enabling TLS-client authentication. The smart card may hold sensitive personal information and have encryption means. In variants, the card cannot encrypt but is used to sign sensitive operations, if any. In still other variants, the card is used for both encryption and signing operations. The device is preferably equipped with a standard smart card reader 17. Finally, the device has control buttons 18 (e.g., OK, Cancel, etc. selectors) and display 12, for displaying information. It may further be provided with means for entering PIN data (e.g., buttons, a rotary wheel, a PINpad/keyboard, etc.).

Thus, in an embodiment, an SSL/TLS channel is established between the server and the device (step S300). Yet, other types of trustworthy connection can be contemplated.

In a subsequent step (S350), permission data are sent from the server through the established connection, e.g., through the mutually authenticated connection 91 established, as evoked above. Said data are received at the device. They represent use permissions associated to one or more files. The corresponding files may be sent altogether. They may however already be stored on the device (they were sent earlier or were obtained from an independent source) or still they may be obtained at a later stage. Permission data may for instance include object identifiers (or file identifiers) together with corresponding information as to the extent of the use rights. Not all of said object identifiers need to correspond to objects stored on the secure device: the device is able to retrieve what use permission is associated to a given file when queried thereabout. Yet, for the purpose of the present description, one assumes that at least one file is stored on the secure device at some point and that permission data received at the device contain data pertaining to that file. The permission data may for instance consist of at least one cardinality associated to a file identifier. More cardinalities may be involved, each associated to at one type of action. More shall be said later in reference to FIGS. 4 and 5.

Upon reception of the permission data, the permission data are stored on a memory of the device (and not necessarily on a persistent memory). The received permission data may for instance be stored in replacement of older data. The permission data may else be a delta file, indicating change with respect to older data; the device then updates its permission data. Yet, in one way or another, the device is made aware of (step S400) of an updated use permission associated to a given files stored thereon. The device accordingly maintains use permissions associated to one or more files stored thereon. Updating data is generally known per se.

Next, upon receiving a request for using a file, the device processes said request according to a current state of a use permission associated to that file (step S700) or to a directory containing this file. Indeed, directories are listing the names of files logically contained within them. Use permissions for such directories may advantageously be relied upon, which would basically result in limiting the visibility of the files they contain, i.e., rendering files within a directory with insufficient use permissions not only inaccessible but also invisible to the PC.

Figure 2:
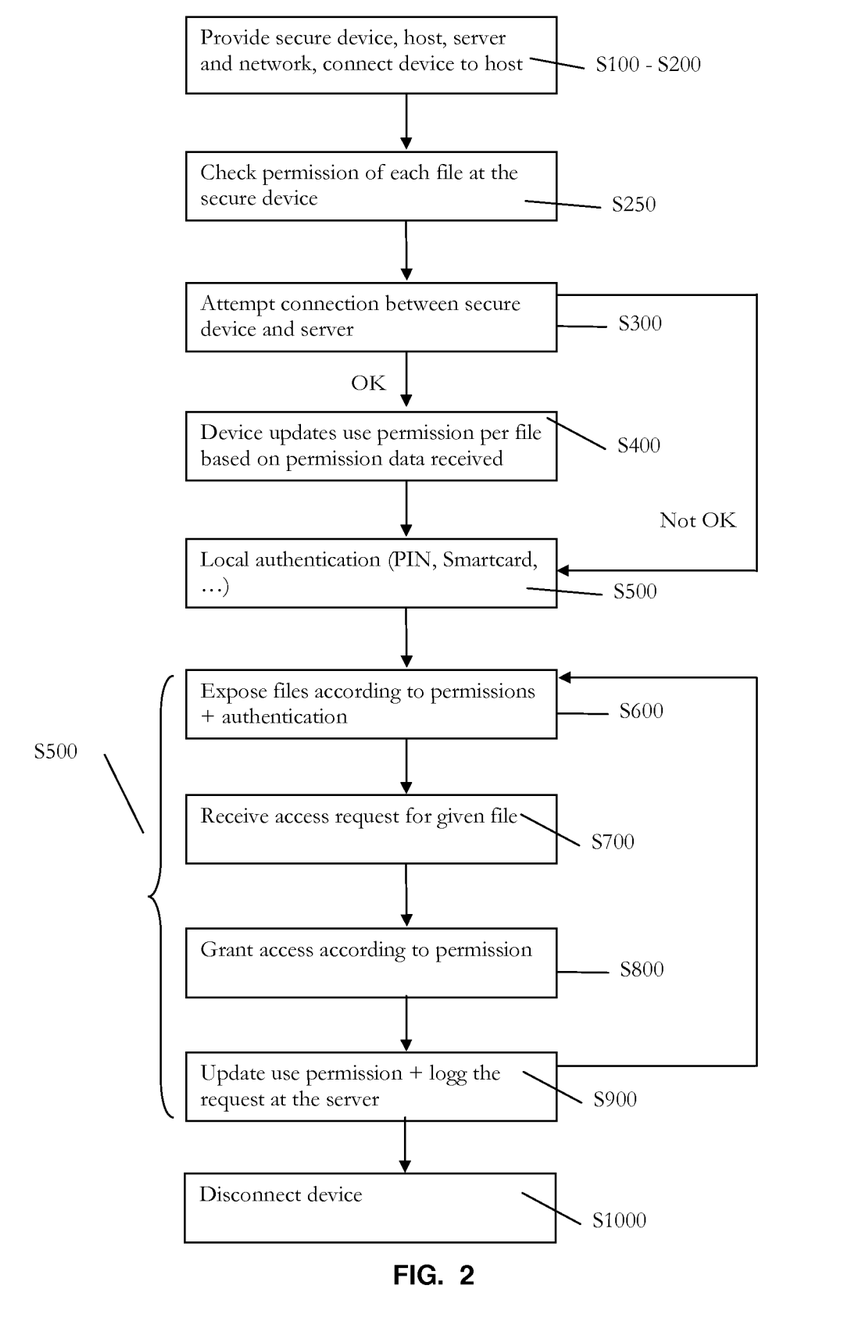
FIG. 2 is a flowchart depicting steps of a method according to another, more detailed embodiment.

Note that in variants to the embodiment of FIG. 1 or 2, the device would attempt to connect to the server upon receiving the request for using the file, such that the steps S200-S400 could actually be carried out after receiving the request for using the file. In that case, the request is processed according to more recent use permission for that file. In all cases yet, upon receiving a request for using a file, the secure device processes the request according to an updated permission, wherein the updated permission has been obtained by connecting to the server and obtaining permission data therefrom.

Next, concerning the types of requests: the request for using the file may for example simply be a request to view contents of the file. If the use permission allows, said contents are displayed e.g., on a display 12 of the secure device 10. This is practical as long as the size of the document does not prevent it. In other cases, the device may for instance need to be set in communication with an external output device to complete the request. The request may be received from an external application, e.g., that requests to copy a file (or to communicate contents thereof) e.g., for subsequent display or printing. How to communicate contents of the files to an external device is known per se.

For example, the secure device can be configured to be connectable to a beamer (e.g., a display device with no "computing" capability, i.e., which can not be exposed to malware), using for instance secure Bluetooth pairing (SSP). As another example, the secure device is connectable to a printer, using a USB cable or secure Bluetooth paring (SSP). This allows a document to be printed directly from the secure device. This is especially useful if the document at stake is not allowed to be printed via the user's PC (due to its associated use permission). Thus, the external output device may typically be a printer or a beamer. Yet, it may also be a PDA or the PC 30 itself (to which the device is likely already connected), for which the use permission is likely more stringent than for a beamer or printer, depending on the company policy. Note that, in embodiments, a printer or beamer can part of the secure device itself.

In all cases, if the use request is granted by the device, the use permission associated to the file at stake is updated (step S900).

Comments are in order.

According to a first variant, updating the use permission after granting a request (step S900) is preferably carried out directly at the device (typically, a cardinality is decremented). Corresponding data shall nonetheless be sent to the server, which consistently updates use permission as maintained on the server side. This way, the device maintains up-to-date use permissions. Thus, the device can still process another request for the same file, even if a subsequent attempt to obtain updated permissions from the server fails (or existing permissions do not mandate obtaining updated permissions, e.g., to allow offline use). In this variant, a concurrent update mechanism is implemented both at the server and at the secure device. Reconciliation is however needed at some point. Several possibilities exist to reconcile the permissions (several algorithms for synchronizing two database instances are known). The device may for instance periodically attempt to connect to the server and get updated permission data, or attempt to connect upon starting, authenticating the user, or upon receiving another file use request, etc. In any case, permissions as received from the server would likely, when available, supersede local permission. However, without server connectivity, the device preferably updates local permissions, possibly rendering access to files impossible if the use permission cardinalities are reduced to naught.

Now, according to a second variant, upon processing a file use request, the device informs the server accordingly, and if necessary (e.g., upon granting a request only). The server shall accordingly be able to update use permissions. When the device later connects to the server (e.g., upon receiving another request for using a file), up-to-date permissions are sent to the device for subsequent processing. In this case, it is not mandatory to update the permission directly at the device after granting a request, as the device shall systematically rely on permissions as received from the server. Again, the device may for instance periodically attempt to connect to the server, or attempt to connect upon starting, authenticating the user, or attempt to connect each time another file use request is received, etc. There, permissions as received from the server would supersede a previous version. However, in this variant, the device is strongly dependent on the availability of server connections. For instance, the device may attempt to connect to the server each time it receives a request for using a file. Yet, if an attempt to reach the server fails, a request cannot be processed based on most up-to-date permission data. Several fallback algorithms may thus be contemplated as to how to proceed in case newer permissions cannot be reached. One solution consists of refusing the request. Another solution is to rely on a previous version of permission data. Intermediate solutions are of course possible.

Thus, several mechanisms can be invoked for maintaining updated permissions, which ranges from a full centralized solution (only the server updates a permission after granting a request) to concurrent solutions (the device locally updates permissions upon granting a request for using a file and accordingly informs the server). What suitable mechanism to implement actually depends on the security policy retained.

In all cases, requests for using the file are preferably logged by the device and can be logged additionally at the server, for the purpose of audit or passive security.

As said, the files may be obtained from the server as well (in addition to their associated permissions), for instance via a secure connection 91 as described above. In variants (not preferred), the file may be obtained from the user's PC or from a remote terminal connected to the network. In embodiments, a desired file is first sent from the terminal to the server, and then sent from the server to the device, which improves security and/or control of the files to be distributed. As noted earlier, the associated permissions may be sent altogether, before or after sending the files.

In embodiments, files stored on the device are encrypted according to a given encryption scheme. The file can be encrypted by the device itself. For example, the secure device is provided with an encryption key stored in an internal memory thereof (not externally accessible) or on a smart card inserted therein. In a variant, the file is transferred to the device in an encrypted state (and this independently from the encryption inherent to the secure connection, if any), such that it shall in fine be stored on the device in an encrypted state. In both cases, a decryption key can be sent from the server to the device, or entered manually by the user on the device, for decrypting the file, e.g., at a later stage and upon request. Incidentally, we note that a permission control mechanism can be implemented with respect to decryption keys as well, just as for the files.

Next, in reference to FIG. 2, another embodiment of the method of the present invention shall be described. It is understood that several of the above variants apply to the embodiment of FIG. 2 too.

Here, steps S100, S200, S300, S400, S700, S800 and S900 essentially correspond to their counterpart steps in FIG. 1.

According to the embodiment of FIG. 2, the device preferably checks permission of each file (step 250) before actually attempting a connection to the server. Note that it is not mandatory to check permission before connecting to the server. It is however preferably done so, in order to allow the device to make any decision as to whether to expose the files or not to the PC (and even whether to list the presence of files).

Then, the device attempts to connect to the server, step S300. If the connection succeeds, the device updates use permission per file, step 400, based on permission data received from the server, as already described in reference to FIG. 1.

Next, the device may proceed to locally authenticate the user (e.g., by requiring the user to input a PIN, using a smart card or the like, as known per se), step S500. Note that if the previous attempt to connect to the server fails, the device would directly prompt the user to authenticate her(him)self, as depicted in FIG. 2. In a variant, the device may require the user to authenticate before actually attempting connection to the server. In another variant, the user may be requested to manually enter a decryption key.

Advantageously, it is then instructed (step S600) at the device to expose the files (e.g., to a user interface or any application) according to the use permission associated to the file, as recently updated at the device. Incidentally, whether to expose the files shall further depend on a success of the user authentication. Accordingly, a file may be prevented from being exposed if the corresponding permission does not allow it (e.g., no more use rights for this file). Thus, the user (or an external application) would not even "see" the file at stake, even if the user is locally correctly authenticated, which further reduces the risk of misuse.

The next steps describe a mechanism according to which a request to access a file (S700) stored on the device is processed (step S800), i.e., based on an updated permission. After processing the request, the permission is updated, if necessary (step S900).

As described earlier, a connection established with the server may further allows for sending files, encryption keys, etc, from the server to the device, in addition to the sole file permissions. As further noted in reference to FIG. 1, different scenarios might be involved.

1) In a first scenario, the secure device receives the files from the server and via the host (or more exactly via the connection 91 relayed by the host), as said earlier.
2) In a second scenario, the secure device initially receives the document from the host, i.e., a PC, but this, independently from the server.
3) In a third scenario, the secure device may receive given files from a terminal that differs from the host through which the permissions are received, and possibly at a different time. Here the terminal can for example be a PDA or mobile phone. The document may for instance be preliminary downloaded at the terminal through an Internet query. Provided an object identifier is available for that document and that data permissions use a compatible object identifier formalism, then the core steps of the methods as described earlier can still be implemented.
4) etc.

Figure 4:
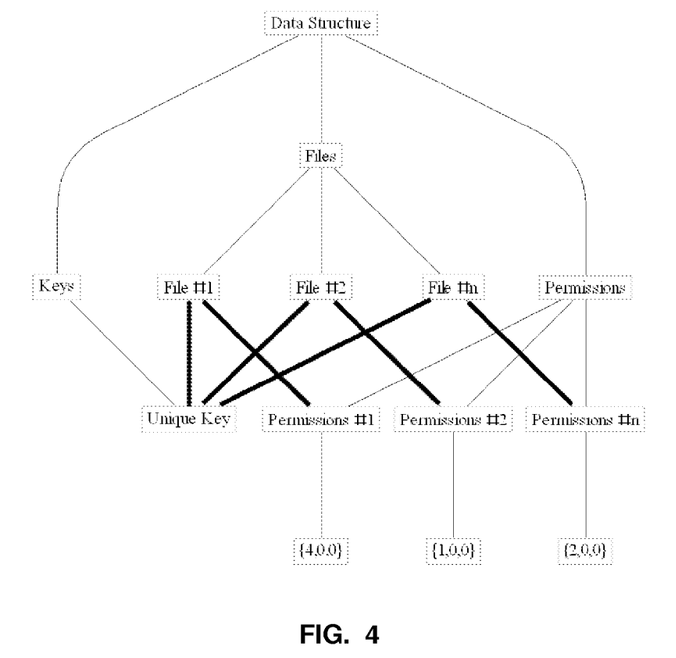
FIGS. 4 and 5 schematically depicts examples of data structures that show interrelations between use permissions and corresponding files as maintained in a device according to an embodiment of the invention.
Figure 5:
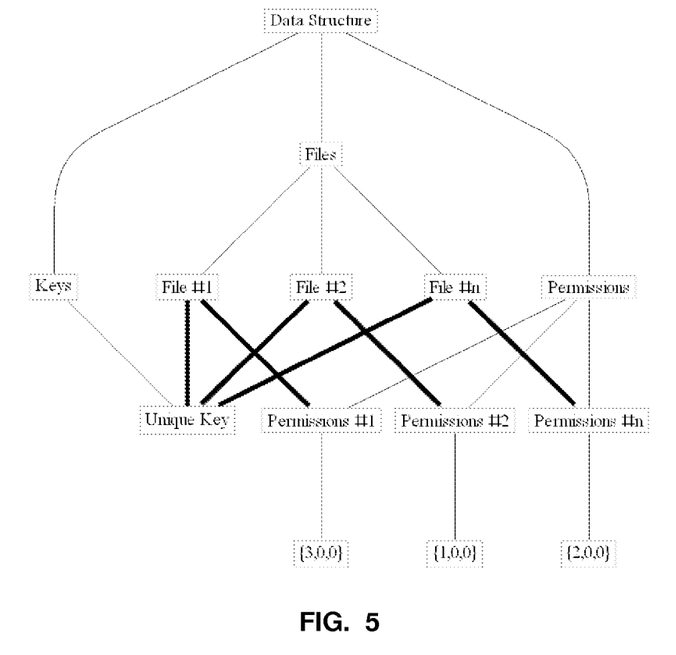

More shall be said now as to examples of data structures that can be implemented at the device to maintain and make use of file permissions, and this, in reference to FIGS. 4 and 5. The layered graph plots represented in FIGS. 4 and 5 are schematic representations of data structures that can be stored on the secure device to implement embodiments of the present invention. In detail, the depicted data structures generally comprise:

Keys (for encrypting/decrypting files);
  Here a unique key "Unique Key" is involved, which allows to store the files in an encrypted state. Of course this key does not have to be unique for the whole device. It may further be present at file or directory level too.
Files;
  Comprising the files #1 to n;
Permissions, the set of permissions comprising:
  Permissions #1 to n, i.e., one permission per file or even, one subset of permissions per file. In particular, a set $\{i, j, k\}$ of permissions might be associated to a file, as depicted here.

Here plain lines represent hierarchical relations in the data structure, whereas bold lines represent functional relationships between data, e.g., "File #1" is encrypted using "Unique Key" and is allowed to be accessed based on "Permission #1", the latter equal to $\{4, 0, 0\}$ in this example.

A set of permissions may consist of cardinalities $\{i, j, k, \ldots\}$, where $i, j, k, \ldots$ are associated to a respective action, i.e., each number represents the number of times a respective application is allowed to access a file. For example, "Permission #1" is equal to $\{4, 0, 0\}$ in FIG. 4, wherein 4, 0, 0 are for example respectively associated to applications requesting to access File #1: for
  (1) Displaying at the device;
  (2) Displaying at an external output device; and
  (3) Printing at an external printer.

Incidentally, since a given "Permission #n" is actually constituted by the corresponding set $\{i, j, k\}$ in this example, the hierarchical level corresponding to "Permission #1" to "Permission #n" is superfluous.

Thus, the example of data structure depicted in FIG. 4 notably means that the user may require File #1 to be displayed at the device only and only four times. Upon requesting to display File #1 (that is, step 700 in FIG. 1 or 2), the device would process the request by:
  granting it (step 800);
  decrypting it (using the unique key necessary in this example), if necessary; and
  instructing to display File #1.

Furthermore, the device shall update the corresponding permission (or accordingly inform the server for subsequent update) as the request has been granted.

The set of permission is accordingly changed into $\{3, 0, 0\}$, indicating that the file is still available for display at the device, but only three times left, as seen in FIG. 5.

In a variant, Permission #n may consist of a set $\{t_1, t_2, t_3, \ldots\}$, where $t_1, t_2, t_3 \ldots$ correspond to lifetimes associated with File #n and with respective applications.

In another variant, Permission #n may consist of a set abc where each of a, b, or c can be r, w, x, or -, similar to UNIX permissions (rwx indicates that the user has read, write, execute permissions, - - - denotes no permission at all).

Note that if the permissions solely consist of lifetimes or r, w, x, or - permission, there is no need to update the permission after processing the request at the device. It is in this case sufficient for the device to rely on the permission data as maintained at and sent from the server, before processing the request.

In another variant, Permission #n could be represented by a subset $\{\{i, t_1\}, \{j, t_2\}, \{k, t_3\}, \ldots\}$, indicating that File #n can be accessed i times for display at the device and for a period $t_1$ only (or until date $t_1$), etc. In this case, a permission is updated, if necessary, after processing the request. Many other variations are possible, e.g., mixing occurrences, lifetime and r, w, x, or - permissions.

At present, a specific embodiment shall be described, which involves a number of features already discussed above and resolve the two main problems discussed in the background section.

Here, the secure device is equipped with sufficient flash memory so that it can serve as a document store, like a usual USB flash drive. The secure device, potentially used together with a smart card as a user credential store, can establish a mutually authenticated TLS/SSL connection to a server, where documents are securely stored. An encrypted document can be securely transmitted to and stored on the secure device using the TLS/SSL connection. As noted earlier, the secure device is a secure device with no client interfaces for software installation or other functions that would expose it to malware. Thus the document will not be exposed while it is transferred to and stored on the secure device.

The two primary problems described earlier are solved as follows:

1. External data loss: since the documents are encrypted and transmitted over a direct TLS connection between the server and secure device, there is no risk of exposing the document while it is being transmitted to the secure device. Since the document is encrypted while it is stored on the secure device and the latter and/or credential store carrying the keys to decrypt the documents are/is PIN protected, only the correct user will be able to access the documents through the secure device's normal interfaces. Since the stored documents are encrypted, physical attacks on the hardware will also not expose the documents. The encryption keys are either stored in the secure devices internal flash, which is not externally accessible, or on a smart card, which provides a higher level of protection to the document management credentials.

2. Employee data theft: the secure device's authentication mechanisms allow the server to verify that the device is an authentic secure device, and to verify the identity of the secure device's user. A server-driven application is used to allow the user to request that a document be stored on his secure device. The document can originate from the user's PC or the server. Since the user has been authenticated to the server using the secure device, the server has sufficient information to determine if the user is allowed to copy the requested data to the secure device. Furthermore, the server can log all such requests for auditing purposes. The secure device does not provide an interface for the user to store files on it directly from the PC. In this way the server controls which documents can be stored on the device according to the company's policies. No documents bypassing this server/secure device control can be stored on the device. When the server sends a document to the secure device it will also send associated permissions, which will control how the user can access the document (e.g., whether and under which conditions the user is allowed to export the document from the secure device to his PC).

Note that concerning the second problem above, the document can originate from the server as well as the user's PC. Thus the solution provided is not only a mechanism to control which documents a user can copy onto a flash drive, it also gives a company a way to distribute documents to users that are authenticated such that the documents are never inappropriately exposed to a PC.

In addition to the above-mentioned server-control over document storage and retrieval (decryption), the secure device itself also provides a built-in capability to permit the user to request access to specific documents in a very fine-grained manner, i.e., even on a document-by-document basis. The user may for instance request decryption and export of single files, for example, to print them on a printer to which the secure device has been connected, by using the built-in display of the secure device to browse and select single files. In that case, the ZTIC is likely offline (it is preferably connected to an offline printer). The basic permission to do so has to be granted prior to this operation by the server using the above-mentioned application and stored on the secure device. Such permissions may further be augmented by limited lifetimes to further reduce the risk of inadvertent exposure of documents, e.g., by allowing the user only a limited number of local decryptions of a document.

Nothing in this disclosure should be understood to preclude the use of alternative communications protocols (beyond USB) for loading and retrieving documents or document management credentials. In particular, it should be noted that the secure device might use a wireless interface such as Bluetooth to transfer documents for printing or use GPRS networks to request and retrieve document access credentials from the server application.

Moreover, a suitably equipped secure device shall be able to receive server-initiated document and/or credential removal commands without any user interaction in order to further strengthen the server's control over the data.

Computer program code required to implement at least parts of the above invention may be implemented in a high-level (e.g., procedural or object-oriented) programming language, or in assembly or machine language if desired; and in any case, the language may be a compiled or interpreted language. Suitable processors include general and special purpose microprocessors. Note that operations that the device, the terminal, the server or recipient performs may be stored on a computer program product tangibly embodied in a machine-readable storage device for execution by a programmable processor; and method steps of the invention may be performed by one or more programmable processors executing instructions to perform functions of the invention. In all case, the present invention may encompass not only the secure device but a system including this device, augmented with one or more of the following: a terminal, at least one server or any suitable source and possibly an additional device such as a printer or a beamer, for communicating contents of the securely managed files.

More generally, the above invention may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, flash memory or others.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, the device may be configured such as to prevent connection to both the host and an external device at the same time. It may further be provided with a battery or powered by an external device.

What is claimed is:

1. A method for securely managing files, comprising the steps of:

providing a secure device, wherein the secure device is protected by design against malicious software or malware and does not include client interfaces for software installation that would expose the secure device to malware, wherein the secure device is adapted to establish a connection to a server that is not the secure device, via a host connected to the server through a telecommunication network;

encrypting a file at the secure device, using an encryption key, wherein the encryption key is stored (i) on a smart card or an internal memory of the device which is not externally accessible, or (ii) entered by the user at the device;

receiving a request for accessing the file stored on the secure device, wherein the file requires an updated use permission from the server to access the file stored on the secured device;

establishing a connection between the secure device and the server, via the host;

in response to receiving, at the secure device, use permission data sent from the server, updating, at the secure device, a use permission required to access the file stored on the secured device according to the use permission data;

receiving at the secure device a decryption key for decrypting the file, the decryption key sent from the server through the connection established between the secure device and the server; and processing the request, at the secure device, according to the updated use permission required to access the file stored on the secure device.

2. The method of claim 1, further comprising:
storing the file at the secure device, wherein the file was sent from the server through the connection established between the secure device and the server.

3. The method of claim 1, further comprising, after receiving the request at the device:
updating the use permission required to access the file upon granting the request received at the secure device.

4. The method of claim 3, wherein the step of updating the use permission upon granting the request comprises:
updating, at the secure device, the use permission required to access the file.

5. The method of claim 3, wherein the step of updating the use permission upon granting the request comprises:
sending to the server data related to the processed request, through the connection established between the secure device and the server; and
updating, at the server, the use permission required to access the file.

6. The method of claim 1, further comprising:
before receiving the request for using the file and after updating the use permission required to access the file, instructing, at the secure device, to expose the file to a user interface or an application according to the updated use permission.

7. The method of claim 1, wherein the connection established via the host is SSL/TLS connection.

8. The method of claim 1, wherein the updated use permission comprises a parameter, which as interpreted by the secure device for processing a request for using the file, restricts the number of times that the associated file can be accessed or the time during which it can be accessed.

9. The method of claim 1, wherein the updated use permission, as maintained at the secure device, decomposes into several sub-permissions, each associated to a given type of request, wherein the request comprises reading at the secure device, printing at an external printer, or reading from an external device.

10. The method of claim 1, further comprising:
logging, at the server, the request received for using the file.

11. The method of claim 1, wherein the updated use permission comprises a parameter, wherein the parameter is a number of times that the associated file can be accessed.

12. The method of claim 11, further comprising:
granting the request received at the secure device;
in response to granting the request received at the secure device, updating, at the secure device, the use permission required to access the file, by decrementing the number of times that the file can accessed by one;
sending to the server data related to the decrementing of the number of times that the file can accessed, through the connection established between the secure device and the sever; and
updating, at the server, the use permission required to access to the file based on the decrementing of the number of times that the file can be accessed.

13. A secure device protected by design against malicious software or malware, wherein the secure device does not include client interfaces for software installation that would expose the secure device to malware, wherein the secure device is adapted to establish a connection to a server that is not the secure device, via a host connected to the server through a telecommunication network, the device comprising:
a processor;
a memory;
interfaces configured to couple to or interact with a user, a personal computer, and a server;
wherein the memory comprises computer readable program code having computer readable instructions which, when executed, cause the processor to carry out the steps of a method comprising:
encrypting a file at the secure device, using an encryption key, wherein the encryption key is stored (i) on a smart card or an internal memory of the device which is not externally accessible, or (ii) entered by the user at the device;
receiving a request for accessing a file stored on the secure device, wherein the file requires an updated use permission from the server to access the file stored on the secured device;
establishing a connection between the secure device and the server, via the host;
in response to receiving, at the secure device, use permission data sent from the server, updating, at the secure device, a use permission required to access the file stored on the secured device according to the use permission data;
receiving at the secure device a decryption key for decrypting the file, the decryption key sent from the server through the connection established between the secure device and the server; and
processing the request, at the secure device, according to the updated use permission required to access the file stored on the secure device.

14. A system comprising:
a personal computer;
a server; and
a secure device protected by design against malicious software or malware, wherein the secure device does not include client interfaces for software installation that would expose the secure device to malware, wherein the secure device is adapted to establish a connection to a server that is not the secure device, via a host connected to the server through a telecommunication network, the device comprising:
a processor;
a memory;
interfaces configured to couple to or interact with a user, a personal computer, and a server;

wherein the memory comprises computer readable program code having computer readable instructions which, when executed, cause the processor to carry out the steps of a method comprising:

encrypting a file at the secure device, using an encryption key, wherein the encryption key is stored (i) on a smart card or an internal memory of the device which is not externally accessible, or (ii) entered by the user at the device;

receiving a request for accessing a file stored on the secure device, wherein the file requires an updated use permission from the server to access the file stored on the secured device;

establishing a connection between the secure device and the server, via the host;

in response to receiving, at the secure device, use permission data sent from the server, updating, at the secure device, a use permission required to access the file stored on the secured device according to the use permission data;

receiving at the secure device a decryption key for decrypting the file, the decryption key sent from the server through the connection established between the secure device and the server; and processing the request, at the secure device, according to the updated use permission required to access the file stored on the secure device.

15. A computer readable storage device tangibly embodying a computer readable program code having computer readable instruction which, when implemented, cause a computer to carry out the steps of a method comprising:

providing a secure device, wherein the secure device is protected by design against malicious software or malware and does not include client interfaces for software installation that would expose the secure device to malware, wherein the secure device is adapted to establish a connection to a server that is not the secure device, via a host connected to the server through a telecommunication network;

encrypting a file at the secure device, using an encryption key, wherein the encryption key is stored (i) on a smart card or an internal memory of the device which is not externally accessible, or (ii) entered by the user at the device;

receiving a request for accessing a file stored on the secure device, wherein the file requires an updated use permission from the server to access the file stored on the secured device;

establishing a connection between the secure device and the server, via the host;

in response to receiving, at the secure device, use permission data sent from the server, updating, at the secure device, a use permission required to access the file stored on the secured device according to the use permission data;

receiving at the secure device a decryption key for decrypting the file, the decryption key sent from the server through the connection established between the secure device and the server; and processing the request, at the secure device, according to the updated use permission required to access the file stored on the secure device.

* * * * *